United States Patent [19]

Ouchi et al.

[11] Patent Number: 4,546,695
[45] Date of Patent: Oct. 15, 1985

[54] LOUVERED GRILLE UNIT AND METHOD OF ITS MANUFACTURE

[75] Inventors: Toshiki Ouchi, Fujisawa; Yoshiaki Sano, Fuji, both of Japan

[73] Assignees: Nissan Motor Company, Limited, Yokohama; Nihon Plast Company, Limited, Fuji, both of Japan; part interest to each

[21] Appl. No.: 420,845

[22] Filed: Sep. 21, 1982

[30] Foreign Application Priority Data

Oct. 13, 1981 [JP] Japan .................................. 56-161969

[51] Int. Cl.$^4$ .............................................. F24F 13/08
[52] U.S. Cl. .................................... 98/121.2; 264/242
[58] Field of Search .............. 98/40 V, 121 A, 121 R, 98/40 UM; 264/230, 242, 273, 264, 249; 403/269, 273; 384/272, 271, 246

[56] References Cited

U.S. PATENT DOCUMENTS

| 207,313 | 8/1878 | Smith ................................. 384/271 |
| 2,513,463 | 7/1950 | Eklund et al. ........................ 98/40 |
| 4,345,510 | 8/1982 | Sterett ................................. 98/40 |

FOREIGN PATENT DOCUMENTS

| 841945 | 7/1949 | Fed. Rep. of Germany . |
| 0264065 | 12/1949 | Switzerland ...................... 98/121 R |

*Primary Examiner*—William E. Wayner
*Assistant Examiner*—John M. Sollecito
*Attorney, Agent, or Firm*—Jeffery, Schwaab, Mack, Blumenthal & Evans Schwartz

[57] ABSTRACT

A grille unit has a frame and a vane pivotally connected to the frame via opposing first and second shafts. The frame has first and second holes snugly receiving the first and second shafts respectively. The first shaft has a peripheral surface, the diameter of which continuously varies along the axis thereof. The second shaft has a similar peripheral surface. The varying-diameter surfaces of the first and second shafts face in opposite directions. The frame has a first inner surface which conforms to the varying-diameter surface of the first shaft to engage the latter. The frame has a second inner surface which conforms to the varying-diameter surface of the second shaft to engage the latter. A method of manufacturing the grille unit includes the steps of forming the frame from plastic, and assemblying a mold with the frame positioned within the mold. In this case, the mold has therein a space snugly accommodating the frame, a cavity conforming to the vane for making the vane, first and second passages connecting the first and second holes of the frame with the cavity respectively, and a gate extending from the outside of the mold to the cavity. After assembly of the mold, soft plastic is injected into the cavity via the gate until the injected soft plastic fills the first and second holes of the frame via the first and second passages.

11 Claims, 9 Drawing Figures

LOUVERED GRILLE UNIT AND METHOD OF ITS MANUFACTURE

BACKGROUND OF THE INVENTION

1. Field of the Invention

This invention relates to a louvered grille unit which is generally mounted over a fluid or air outlet to adjustably direct fluid or air. Also, it relates to a method of manufacturing the grille unit.

2. Description of the Prior Art

An automotive vehicle has air outlets in its instrument panel to ventilate or air-condition the passenger compartment. The air outlets are usually equipped with grille units for directing the air. Some grille units have pivotal parallel vanes or louvers to allow the direction of discharged air flow to be changed manually.

Japanese Patent Publication No. 54-26266 (Filing No. 51-92432) discloses such an adjustable louvered grille unit and a method of its manufacture. The grille unit has a frame and louvers or vanes pivotally mounted to the frame. The vanes are made by injection molding. After a mold for the vanes is assembled with the previously-formed frame positioned within the cavity of the mold, synthetic resin is injected into the mold. The frame has holes which are to allow pivotal engagement between the frame and the vanes in the finished product. A fraction of the synthetic resin fills the holes during molding to form vane pivots which are rotatably received in the holes. The holes have a stepped profile to provide the ends of the vane pivots with bosses or greater-diameter portions. The bosses limit or prevent movement of the vanes along the axes of the pivots. The bosses are pressed against the frame due to mold shrinkage, resulting in frictional contact between the frame and the vanes. Thus, the vanes remain in their respective angular positions as long as they receive no pivotal force.

However, in such a grille unit, pressure between the frame and the bosses tends to be excessively great, preventing smooth rotation of the vanes and immoderately deforming the frame. What is worse, each of the frictional contacts between the frame and the vanes is liable to be angularly uneven, so that irregularly varying forces are necessary to pivot the vanes.

SUMMARY OF THE INVENTION

It is an object of this invention to provide a grille unit of the above-mentioned type and a method of its manufacture which produce suitable pressure between the frame and the bosses to allow smooth rotation of the vanes and to prevent the frame from being excessively deformed.

In accordance with this invention, a grille unit has a frame and a vane pivotally connected to the frame via opposing first and second shafts. The frame has first and second holes snugly receiving the first and second shafts respectively. The first shaft has a peripheral surface, the diameter of which continuously varies along the axis thereof. The second shaft has a similar peripheral surface. The varying-diameter surfaces of the first and second shafts face in opposite directions. The frame has a first inner surface which conforms to the varying-diameter surface of the first shaft to engage the latter. The frame has a second inner surface which conforms to the varying-diameter surface of the second shaft to engage the latter.

In accordance with this invention, a method of manufacturing the grille unit includes the steps of forming the frame from plastic, and assembling a mold with the frame positioned within the mold. In this case, the mold has therein a space snugly accommodating the frame, a cavity conforming to the vane for making the vane, first and second passages connecting the first and second holes of the frame with the cavity respectively, and a gate extending from the outside of the mold to the cavity. After assembly of the mold, soft plastic is injected into the cavity via the gate until the injected soft plastic fills the first and second holes of the frame via the first and second passages.

The above and other objects, features and advantages of this invention will be apparent from the following description of preferred embodiments thereof, taken in conjunction with the drawings.

BRIEF DESCRIPTION OF THE DRAWINGS

Like reference numerals denote like parts throughout the drawings.

DESCRIPTION OF THE PREFERRED EMBODIMENTS

Figure 1:
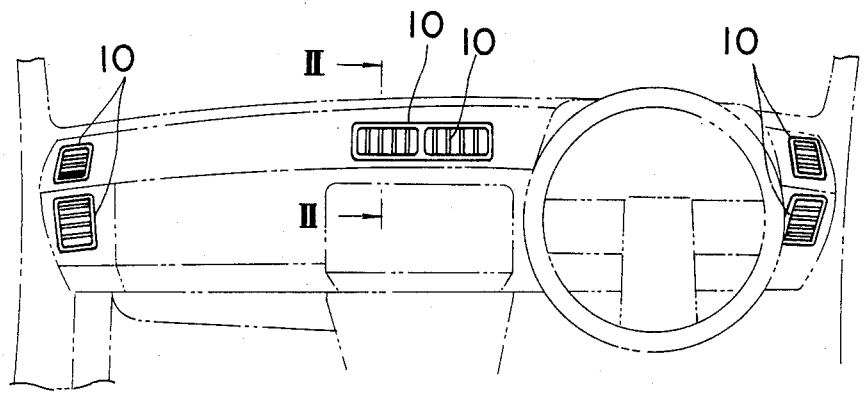
FIG. 1 is a perspective view of an automotive vehicle instrument panel furnished with grille units according to a first embodiment of this invention.

With reference to FIG. 1, there is shown an automotive vehicle instrument panel furnished with air outlets in each of which a grille unit 10 is installed. The grille units 10 are in accordance with a first embodiment of this invention and are essentially similar to each other.

Figure 2:
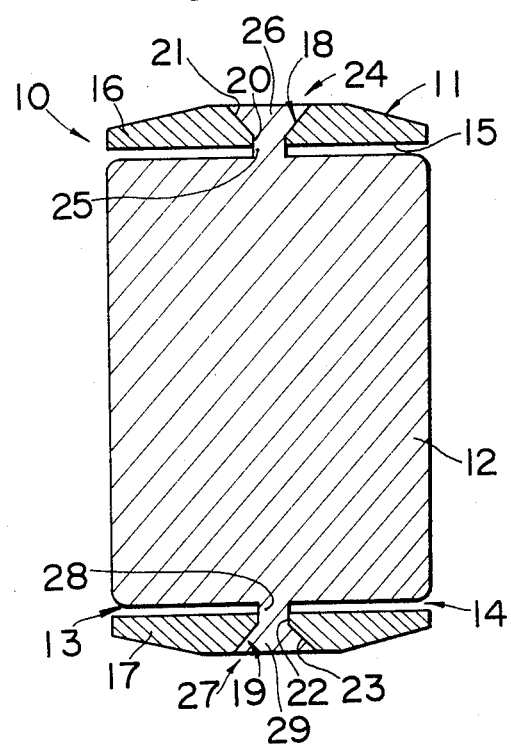
FIG. 2 is a sectional view of the grille unit taken along II—II of FIG. 1.

As shown in FIG. 2, a representative grille unit 10 has a frame 11 and a plurality of louvers or vanes 12 pivotally mounted to the frame 11. The frame 11 has opposite openings 13 and 14, and a hollow 15 extending from the opening 13 to the other opening 14. The frame 11 fits in the air outlet in such a manner that air must enter the hollow 15 via the opening 13 and exit via the opening 14 before entering a vehicle passenger compartment. The frame 11 includes parallelly spaced upper and lower walls 16 and 17 defining the hollow 15 in conjunction with opposite side walls (not shown).

The vanes 12 are identically rectangular, and are positioned in the hollow 15 in such a manner as to be parallelly spaced. One edge of each vane 12 extends parallel to the upper wall 16 with a small gap formed therebetween. The opposite edge of each vane 12 extends parallel to the lower wall 17 with a small gap formed therebetween.

The walls 16 and 17 have, respectively, vertically aligned holes 18 and 19 of circular cross-section extending therethrough. A pair of holes 18 and 19 are provided for each vane 12. The group of the holes 18 are collinear and regularly spaced along the center of the wall 16. Similarly, the other holes 19 are collinear and regularly spaced along the center of the wall 17. The inside diameter of each hole 18 is constant starting from the inner surface of the wall 16 until a preset position between the inner and outer surfaces of the wall 16 and then increases at a fixed slope from the preset position to the outer surface of the wall 16. In this way, each hole 18 has a constant-diameter or cylindrical portion 20 and a frustum or frusto-conical tapered portion 21 at a position to the contiguous outside of the cylindrical portion 20. Each hole 19 is identical to the hole 18, and has a constant-diameter or cylindrical portion 22 and a frustum or frusto-conical tapered portion 23 at a position to the contiguous outside of the cylindrical portion 22. The frustrum portion 23 of each hole 19 faces in the direction opposite that of the frustum portion 21 of the associated hole 18.

A shaft 24 projects outwardly, i.e., upwardly from the center of the vane edge close to the wall 16, and is formed integrally with the vane 12. The shaft 24 conforms to the hole 18 and rotatably fits therein. In more detail, the shaft 24 has a constant-diameter or cylindrical portion 25 at its base and a frustum or frusto-conical tapered portion 26 at its tip. The shaft cylindrical portion 25 is longer than the hole cylindrical portion 20. The shaft cylindrical portion 25 except its inner end is accommodated within the corresponding portion 20 of the hole 18. The frustum portion 26 of the shaft 24 mates with and fits in the corresponding portion 21 of the hole 18. Another shaft 27 projects outwardly, i.e., downwardly from the center of the vane edge close to the wall 17, and is formed integrally with the vane 12. The shaft 27 is identical to the shaft 24 and aligns axially with the latter. The shaft 27 conforms to and rotatably fits within the hole 19. The shaft 27 has a constant-diameter or cylindrical portion 28 at its base and a frustum or frusto-conical tapered portion 29 at its tip. The cylindrical portion 28 of the shaft 27 is accommodated within the corresponding portion 22 of the hole 19. The frustum portion 29 of the shaft 27 mates with and fits in the corresponding portion 23 of the hole 19. The frustum portion 29 of the shaft 27 faces in the direction opposite that of the corresponding portion 26 of the shaft 24. The shafts 24 and 27 are provided for each vane 12.

Each vane 12 can be manually pivoted about the shafts 24 and 27. The frustum portion 26 of the shaft 24 slidably but frictionally engages the wall 16 defining the frustum portion 21 of the hole 18. The frustum portion 29 of the shaft 27 slidably but frictionally engages the wall 17 defining the frustum portion 23 of the hole 19. The frictional engagement between the shaft 24 and the wall 16 and that between the shaft 27 and the wall 17 cause the vane 12 to remain in its current angular orientation as long as no pivotal force is exerted on the vane 12. Additionally, the engagement between the shaft frustum portion 26 and the wall 16 and that between the shaft frustum portion 29 and the wall 17 cooperate to limit vertical displacement of the vane 12 and to secure the vane 12 within the frame 11. The like vertical edges of the vanes 12 are hinged to an interlinking arm (not shown) which cooperates with the shafts 24 and 27 to maintain the parallel orientation of the vanes 12 regardless of the selected angular position thereof.

The grille unit 10 is fabricated utilizing injection molding. The frame 11 is made of a plastic, such as acrylonitrile-butadiene-styrene copolymer-resin (ABS resin). The vanes 12 are made of another plastic, such as polypropylene resin (PP resin). The material of the vanes 12 is chosen so that the melting point thereof is lower than that of the material of the frame 11, that the mold-shrinkage rate thereof is relatively great, and that it usually does not adhere or bond to the material of the frame 11.

Figure 3:
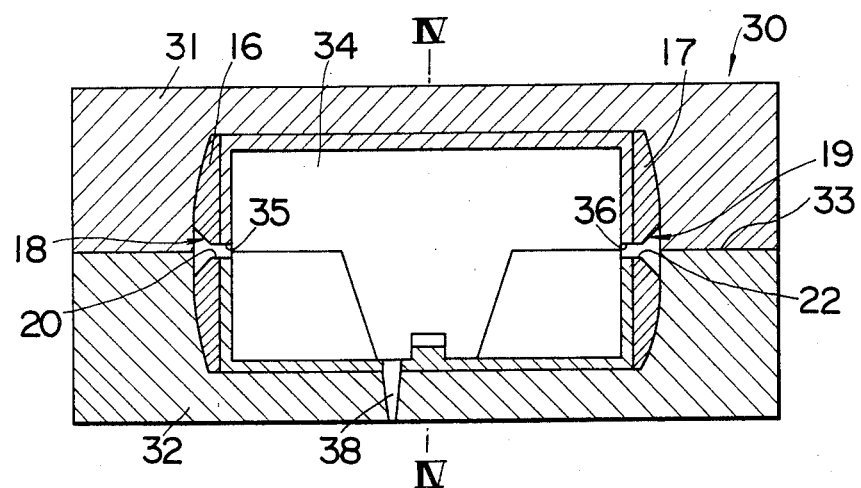
FIG. 3 is a cross-sectional view of an assembled mold for the grille unit.
Figure 4:
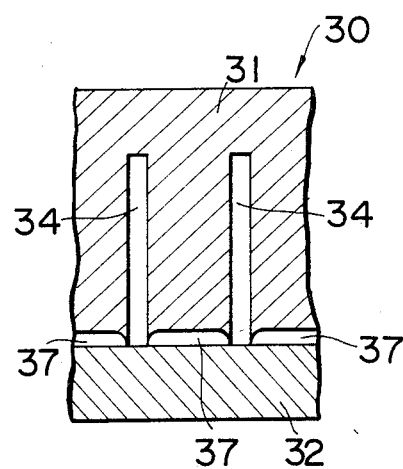
FIG. 4 is a sectional view of the mold taken along line IV—IV of FIG. 3.

FIGS. 3 and 4 show a mold 30 for use in the grille unit injection molding assembled in preparation for soft plastic injection. The mold 30 has mating first and second mold halves 31 and 32, one being movable and the other being stationary in a well-known way. The mold halves 31 and 32 have respectively rectangle-surrounding grooves, which register with one another to snugly accommodate the frame 11 in such a manner that a half or central line of the frame 11 is collinear with the parting line 33 of the mold 30 when the mold halves 31 and 32 are assembled for operation. Also the assembled mold halves 31 and 32 define a plurality of parallelly-spaced rectangular cavities 34 therein. The cavities 34 conform to the vanes 12, being used to form them. The cavities 34 are essentially segregated from the frame grooves by thin walls of the mold halves 31 and 32, which define, when assembled, passages or holes 35 and 36 of constant circular cross-section on the opposite sides of the cavities 34. The inside diameter of the holes 35 and 36 is essentially equal to that of the hole cylindrical positions 20 and 22 in the frame 11. The holes 35 and 36 respectively align contiguously with the holes 18 and 19 and connect them with the cavities 34 when the mold halves 31 and 32 with the frame 11 are assembled for operation. The assembled mold halves 31 and 32 define therein grooves 37 running between like or corresponding edges of the cavities 34 remote from the holes 35 and 36. The grooves 37 are essentially at the centers of the associated edges of the cavities 34 and connect the cavities 34. The grooves 37 serve to form the arm interlinking the vanes 12. Ends of the grooves 37 adjacent to the cavities 34 are curved or tapered to form hinge connections between the arm and the vanes 12. The mold 30 has a passage or gate 38 extending from the outside thereof to one of the cavities 34. Soft plastic is injected into the cavities 34 via the gate 38.

During manufacture, the frame 11 with the holes 18 and 19 is fabricated beforehand. The mold halves 31 and 32 are assembled for injecting soft plastic with the frame 11 set in place within the mold 30. After assembling the mold halves 31 and 32, a soft plastic for the vanes 12 is injected into the cavity 34 via the gate 38. The soft plastic travels to the other cavities 34 via the grooves 37. The soft plastic also travels to the holes 18 and 19 via the holes 35 and 36. Thus, the cavities 34, the grooves 37, and the holes 18, 19, 35, and 36 are filled with the soft plastic. It is necessary to regulate temperature of the frame 11 to preset levels lower than the melting point thereof. After the plastic injection is completed, the injected plastic is solidified and then the mold halves 31 and 32 are separated in order to take out the finished grille unit 10. The plastic in the cavities 34 forms the vanes 12, while that in the grooves 37 forms the interlinking arm. The plastic in the holes 18, 19, 35, and 36 forms the shafts 24 and 27. Specifically, the plastic in the hole cylindrical portions 20 and 22, and the holes 35 and 36 forms the shaft cylindrical portions 25 and 28, while the plastic in the hole frustum portions 21 and 23 forms the shaft frustum portions 26 and 29.

Figure 5:
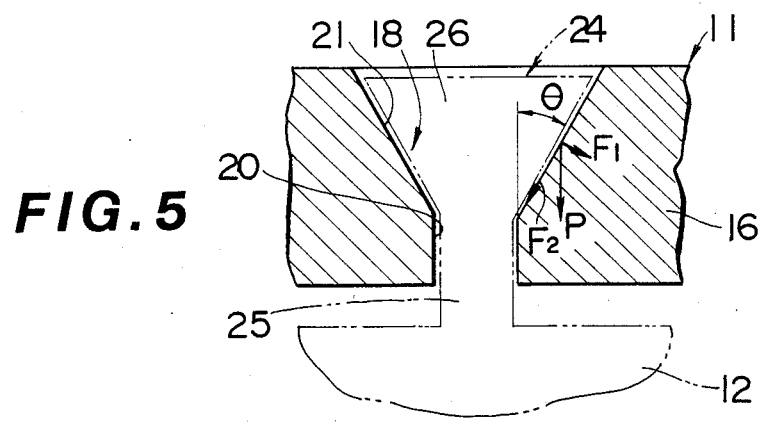
FIG. 5 is an enlarged partial view of FIG. 2 showing the engagement of the vane and the frame more clearly.

As shown in FIG. 5, resulting mold shrinkage in the plastic causes the outside diameter of the shaft cylindrical portions 25 and 28 to be slightly smaller than the inside diameter of the hole cylindrical portions 20 and 22, permitting rotation of the shaft portions 25 and 28 within the hole portions 20 and 22. Also the mold shrinkage results in a similar reduction in the dimensions of the shaft frustum portions 26 and 29 and displacement thereof toward the centers of the vanes 12. Thus, the tapered surfaces of the shaft portions 26 and 29 forceably engage the tapered surfaces of the frame 11 defining the hole frustum portions 21 and 23, so that the shaft portions 26 and 29 exert force P on the frame 11. Note that the resulting gaps between the shaft cylindrical portions 25 and 28, and the frame 11 defining the hole cylindrical portions 20 and 22 allow part of the displacement of the shaft frustum portions 26 and 29 toward the centers of the vanes 12 without deformation of the frame 11, reducing the force P to a moderate level.

The force P can be divided into two components $F_1$ and $F_2$ perpendicular to and parallel to the associated tapered surface respectively. $F_1$ is essentially equal to $P \cdot \sin \theta$, where $\theta$ is the angle of taper on the shaft frustum portions 26 and 29. $F_1$ is concerned in the frictional contacts between the frame 11 and the shafts 24 and 27. The angle of taper on the shaft portions 26 and 29 is chosen to achieve optimal frictional contact between the frame 11 and the shafts 24 and 27. The contact between the frame 11 and the shafts 24 and 27 via the frustum surfaces results in a self-centering action which ensures smooth rotation of the shafts 24 and 27.

Figure 6A:
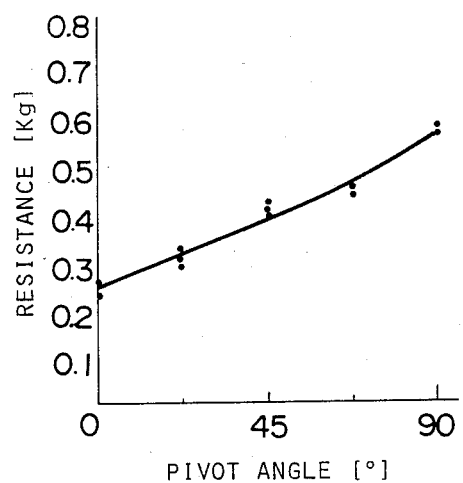
FIG. 6A is a graph of the relationship betwen resistance and angles through which the vanes of the first embodiment are pivoted.
Figure 6B:
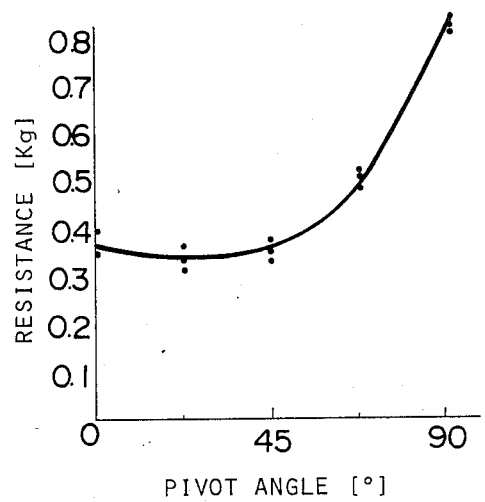
FIG. 6B is a graph of the relationship between resistance and angles through which vanes of a conventional grille unit are pivoted.

FIG. 6A shows the relationship between resistance and angles through which the vanes 12 are pivoted. The resistance is against rotation of the vanes 12 and is essentially proportional to the pivot angle. FIG. 6B shows the corresponding relationship in a conventional grille unit such as is disclosed in Japanese Pat. No. 54-26266. The arrangement of the conventional grille unit corresponds to the case where $\theta$, that is, the angle of taper on the shaft frustum portions 26 and 29, is 90°. In the conventional grille, the resistance changes non-linearly with the pivot angle and abruptly increases with the pivot angle above 80°. The relationships in FIGS. 6A and 6B reveal that the vanes 12 of this invention can be pivoted more smoothly than those of the conventional grille unit. This advantage results from the tapered structures in the shafts 24 and 27, and the holes 18 and 19.

Figure 7:
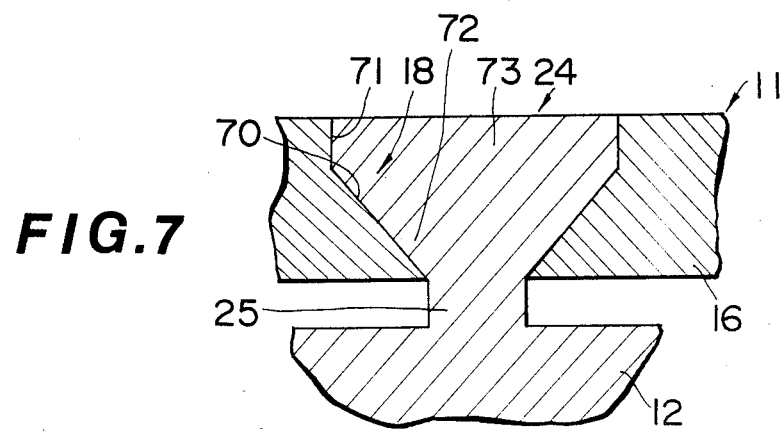
FIG. 7 is a sectional view similar to FIG. 5 and showing the engagement of a vane and a frame of a grille unit according to a second embodiment of this invention.

FIG. 7 shows an essential portion of a second embodiment of this invention, which is designed in a manner similar to the first embodiment except for the following point: The inside diameter of each hole 18 increases at a fixed slope from the inner surface of the frame wall 16 to a preset position between the inner and outer surfaces of the wall 16 and is constant from the preset position to the outer surface of the wall 16. In this way, each hole 18 has a frustum or frusto-conical tapered portion 70 and a constant-diameter or cylindrical portion 71 at a position to the contiguous outside of the frustum portion 70. Each hole 19 (see FIG. 2) is similar to the hole 18. The frustum portion 70 of each hole 18 faces in the direction opposite that of the corresponding portion of the associated hole 19. Each of the vane shafts 24 received in the holes 18 conforms to the hole 18, and thus has a frustum or frusto-conical tapered portion 72 at its base and a constant-diameter or cylindrical portion 73 at its tip. Each of the vane shafts 27 (see FIG. 2) received in the holes 19 is similar to the associated shaft 24. The frustum portion 72 of each shaft 24 faces in the direction opposite that of the corresponding portion of the associated shaft 27. The cylindrical portion 73 serves to reinforce the tip of the shaft 24.

Figure 8:
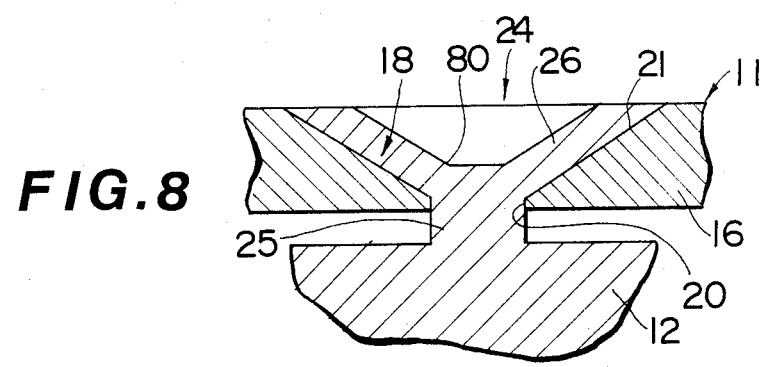
FIG. 8 is a sectional view similar to FIG. 5 and showing the engagement of a vane and a frame of a grille unit according to a third embodiment of this invention.

FIG. 8 shows an essential portion of a third embodiment of this invention which is designed in a manner similar to the first embodiment except for the following point: The end surface of each shaft 24 has a coaxial frustum or frusto-conical recess 80 serving to thin the walls of the shaft frustum portion 26. The tapered surface defining the frustum recess 80 is usually parallel to the tapered surface defining the periphery of the shaft 24. The thin wall facilitates deformation of the shaft frustum portion 26, resulting in smooth rotation of the vane 12. The end surface of each shaft 27 (see FIG. 2) has a similar frustum or frusto-conical recess.

It should be understood that further modifications and variations may be made in this invention without departing from the spirit and scope of this invention as set forth in the appended claims.

What is claimed is:

1. A grille unit for adjustably directing a fluid such as air, comprising:
   (a) a vane;
   (b) axially aligned first and second shafts of circular cross-section extending from the vane in opposite directions; and
   (c) a frame having axially aligned first and second holes of circular cross-section in which the first and second shafts rotatably fit respectively, whereby the vane can pivot about the shafts;
   (d) the diameter of at least part of the first shaft continuously varying along the axis thereof so that the first shaft has a varying-diameter surface;
   (e) the frame having a first inner surface which defines at least part of the first hole and which conforms to and mates with the varying-diameter surface of the first shaft, the frame first inner surface slidably but frictionally engaging the varying-diameter surface of the first shaft;
   (f) the diameter of at least part of the second shaft continuously varying along the axis thereof so that the second shaft has a varying-diameter surface, the varying-diameter surface of the second shaft facing in the direction opposite that of the varying-diameter surface of the first shaft;
   (g) the frame having a second inner surface which defines at least part of the second hole and which conforms to and mates with the varying-diameter surface of the second shaft, the frame second shaft, the frame second inner surface slidably but frictionally engaging the varying-diameter surface of the second shaft;
   wherein said frame is made of a first plastic, and said vane and said shaft are made of a second plastic, said first plastic having a melting point higher, and a shrinking rate smaller, than said second plastic.

2. A grille unit as recited in claim 1, wherein the frame has a hollow between the first and second holes for accommodating the vane.

3. A grille unit as recited in claim 1, wherein the diameter of the varying-diameter surface of the first shaft increases at a fixed slope in the axial direction toward the tip thereof, and wherein the diameter of the varying-diameter surface of the second shaft increases similarly.

4. A grille unit as recited in claim 3, wherein the first and second shafts have first and second cylindrical surfaces respectively at positions to the contiguous insides of the associated increasing-diameter surfaces of the first and second shafts respectively.

5. A grille unit as recited in claim 3, wherein the tips of the first and second shafts have first and second cylindrical surfaces respectively at positions to the contiguous outsides of the associated increasing-diameter surfaces of the first and second shafts respectively.

6. A grille unit as recited in claim 1, wherein the end surface of each of the first and second shafts has a recess to thin the walls thereof.

7. A grille unit as recited in claim 1, wherein the vane with the shafts is formed from a mold-shrinkable plastic by injection molding in which an assembled mold includes the frame in such a manner that the holes of the frame communicate with a mold cavity for making the vane, whereby the vane and the shafts mating with the respective holes of the frame are shaped by filling the mold cavity and the holes of the frame with the injected plastic.

8. A grille unit a ccording to claim 1, wherein the resistance against rotation of said vane is essentially proportional to the pivot angle.

9. A grille unit according to claim 1, wherein the angle of said varying-diameter surfaces of said first and second shafts is chosen to achieve optimal frictional contact between said frame and said shafts.

10. A grille unit according to claim 1, wherein the varying diameter surfaces of said first and second shafts forceably engage the first and second inner surfaces of said frame.

11. A grille unit according to claim 10, wherein said forceable engagement is produced by mold-shrinkage of the material from which said vane is made.

* * * * *